United States Patent [19]

Hepner et al.

[11] Patent Number: 4,545,025

[45] Date of Patent: Oct. 1, 1985

[54] AUTO COVARIANCE COMPUTER

[75] Inventors: Timothy E. Hepner, Gloucester; James F. Meyers, Newport News, both of Va.

[73] Assignee: The United States of America as represented by the Administrator of the National Aeronautics and Space Administration, Washington, D.C.

[21] Appl. No.: 523,560

[22] Filed: Aug. 16, 1983

[51] Int. Cl.[4] ............................................. G06F 15/20
[52] U.S. Cl. .................................................... 364/728
[58] Field of Search ............... 364/728, 819, 554, 570, 364/565; 382/42; 343/378

[56] References Cited

U.S. PATENT DOCUMENTS 3,982,101 9/1976 Kalb et al. ........................... 364/565
4,446,531 5/1984 Tanaka ................................. 364/728

Primary Examiner—James D. Thomas
Assistant Examiner—Dale M. Shaw
Attorney, Agent, or Firm—William H. King; Howard J. Osborn; John R. Manning

[57] ABSTRACT

A laser velocimeter covariance processor which calculates the auto covariance and cross covariance functions for a turbulent flow field based on Poisson sampled measurements in time from a laser velocimeter. The device will process a block of data that is up to 4096 data points in length and return a 512 point covariance function with 48-bit resolution along with a 512 point histogram of the interarrival times which is used to normalize the covariance function. The device is designed to interface and be controlled by a minicomputer from which the data is received and the results returned. A typical 4096 point computation takes approximately 1.5 seconds to receive the data, compute the covariance function, and return the results to the computer.

5 Claims, 3 Drawing Figures

AUTO COVARIANCE COMPUTER

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates generally to laser velocimetry and more specifically concerns an auto/cross-covariance processor for use with a computer in making rapid covariance computations from data obtained from a laser velocimeter.

The laser velocimeter is a non-intrusive flow field diagnostic technique which measures the velocity of micron sized particles embedded in the flow field. If these particles are small enough to faithfully follow the expected flow field dynamics, then the results from the laser velocimeter will be a true representation of the flow field characteristics. The measurement of velocity is made when a particle passes through the fringe pattern within the laser velocimeter sample volume yielding a real time sample of the velocity flow field. A large number of velocity measurements is obtained to minimize the statistical uncertainties in the calculations of the basic flow field statistics such as mean velocity and turbulence intensity. As with any sampling technique, the assumption that the flow is both stationary and ergodic is made. With the exception of the length of time for which the stationarity assumption is valid, the times at which the velocity samples are made and the total sample time is not important for the determination of the basic statistical parameters. This, however, is not the case for time dependent characterizations of the flow field such as correlation functions and turbulence power spectra.

Classic approaches to the determination of the correlation functions and turbulence power spectra utilize direct correlation techniques and/or Fourier transform techniques using uniformally sampled data. The equation for the classic approach to determine the auto correlation function is:

$$R(\tau) = \frac{1}{T} \int_0^{T-\tau} V(t) V(t + \tau) dt$$

When uniform sampling is used, the value of $\tau$ is the constant interval between samples and the kth location in the correlation is located as $k\tau$. In laser velocimeter applications, however, the sampling process is random in nature since the particles which are measured arrive in a Poisson random manner and thus not applicable for classic approaches. Hence, a modification of the direct correlation approach must be used in which the random interarrival times, (the time between successive velocity measurements), are used to determine the appropriate delay time interval into which the cross product is to be summed. However, when this modification is used a large amount of computer time is needed to make the necessary calculations.

It is therefore an object of this invention to provide apparatus for measuring correlation function from data obtained by a laser velocimeter.

Another object of this invention is to provide hardware for use with a computer for measuring correlation functions from random sampled data.

A further object of this invention is to provide hardware for use with a computer to increase the speed of computations of correlation functions from data obtained by a laser velocimeter.

Other objects and advantages of this invention will become apparent hereinafter in the specification and drawings.

SUMMARY OF THE INVENTION

The invention includes five memories, a multiplier, an accumulator and a process controller. Three of the memories store data received from a computer: two of these memories store random sampled laser velocimeter data and the third memory stores interarrival times between successive velocity measurements. The other two memories store data to be sent to the computer: one of these memories stores products of the random sampled data and the other memory stores the number of products for each interarrival time. The process controller controls the flow of data from the three input memories to the two output memories.

DETAILED DESCRIPTION OF THE INVENTION

Figure 1:
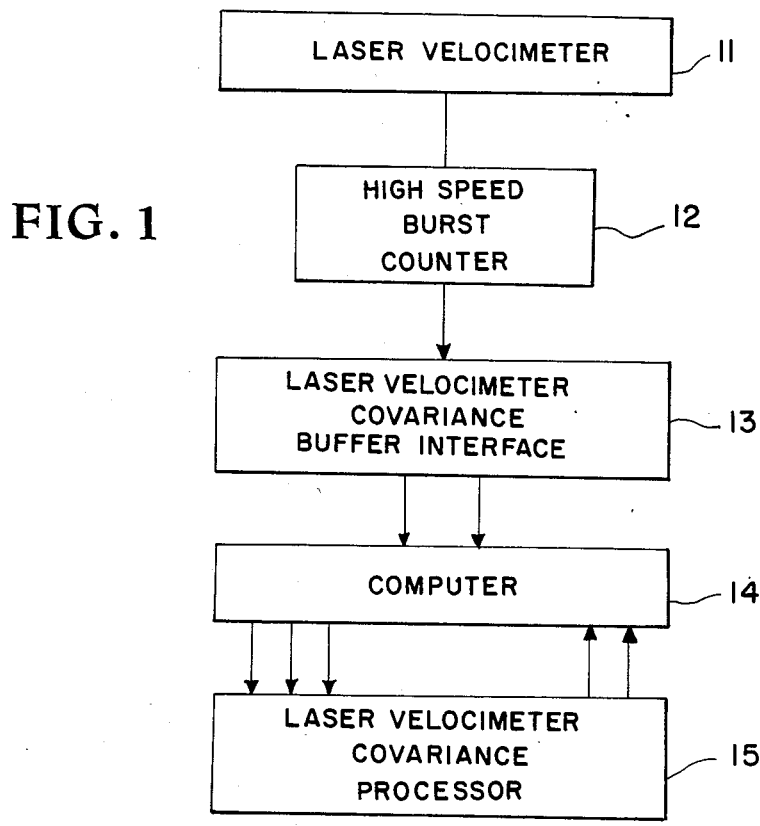
FIG. 1 is a block diagram of the measuring system in which the present invention is used.
Figure 2:
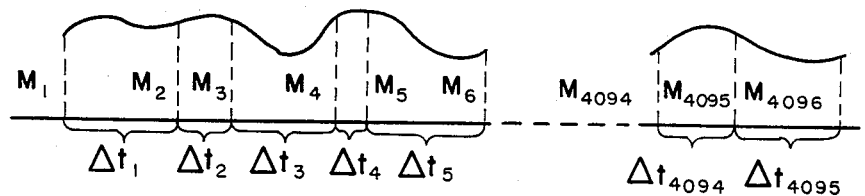
FIG. 2 shows the data generated by the system in FIG. 1 that is fed to the computer.
Figure 3:
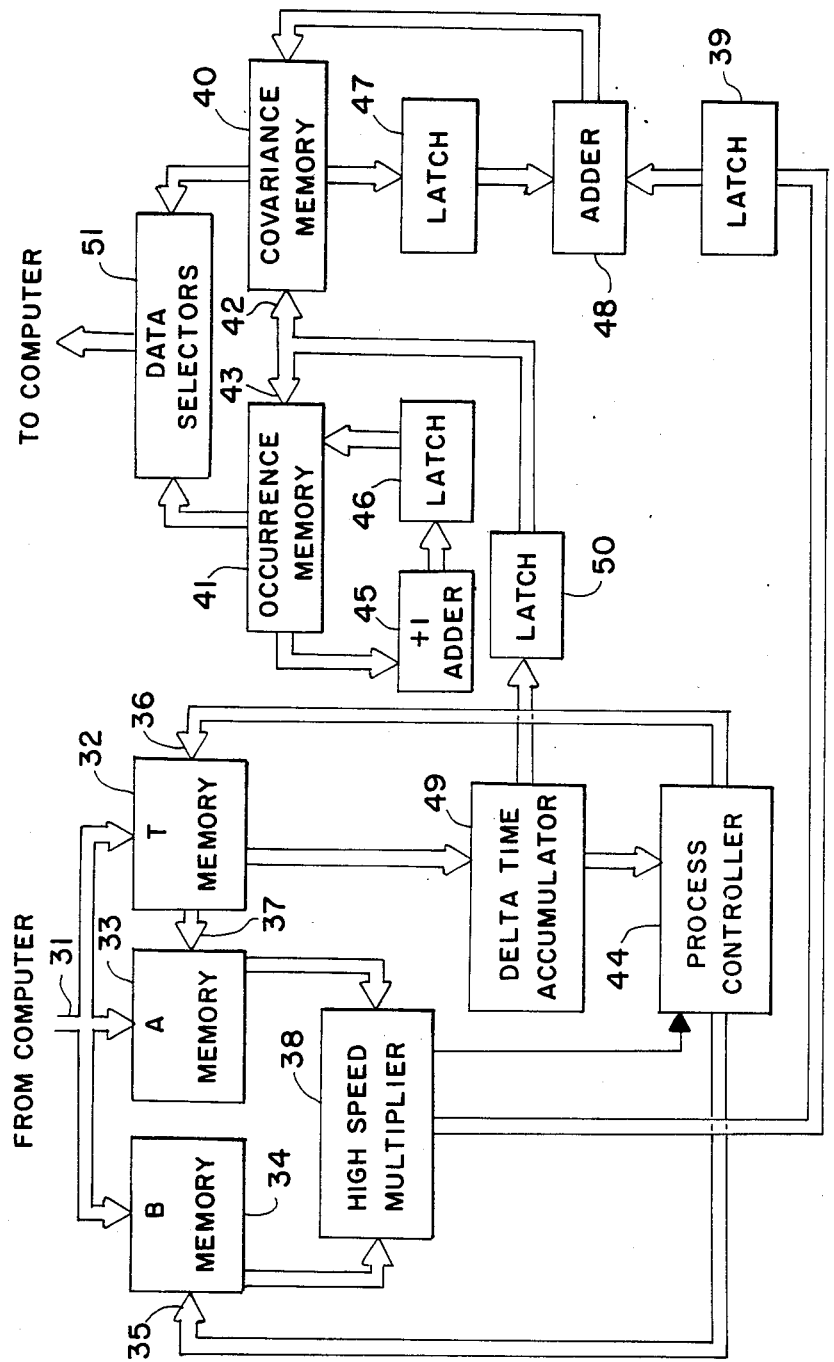
FIG. 3 is a block diagram of the invention.

Referring now to FIG. 1 there is shown a system for measuring autocovariance or crosscovariance in which the present invention is used. In describing the present invention, only the term covariance will be used, but it is to be understood that the term is broad enough to cover both autocovariance and crosscovariance. The velocities of particles in a laser velocimeter 11 are measured by a high speed burst counter 12. For example, as shown by FIG. 2, the velocities $M_i$ ($i = 1, 2, \ldots, 4096$) are measured and the time intervals $\Delta t_i$ ($i = 1, 2, \ldots, 4095$) are measured by the laser velocimeter covariance buffer interface 13. Apparatus for measuring $\Delta t_i$ is disclosed in U.S. patent application, Ser. No. 282,191, filed July 10, 1981, now U.S. Pat. No. 4,392,749.

The $M_i$ and $\Delta t_i$ data is applied to a computer 14 where it is conditioned into a specific integer format. To minimize roundoff error in the computations, the statistical mean is calculated and subtracted from each of the velocity data sets. It is noted that correlation of mean removed data will yield the covariance function instead of the correlation function. The maximum and minimum values of each data set are then determined and the absolute greater of the two in each data set is divided into the value 32,000. The result is then multiplied by each element in the respective data set so that the maximum number of bits is used after the conversion from floating point numbers to integers. The interarrival times $\Delta t_i$ are divided by a chosen value of correlation time interval, $\Delta \tau$, and the results multiplied by the value 16 and converted to integers. At this point the data is conditioned and ready for transfer to a laser velocimeter covariance processor 15.

The data transfer established by direct memory access from the computer 14, with 16-bit parallel data paths 31 and full two-way handshake begins with the transfer of the 4096-conditioned interarrival time data which is stored in a T-memory 32. The next transfer of data is the 4096 point velocity data set, that will be advanced in time during the covariance calculations, which is stored in an A-memory 33. The third data set transferred is a repeat of the velocity data set if auto covariance is desired, otherwise the velocity data set which will be cross-correlated is transferred and stored in a B-memory 34. Memories 32, 33 and 34 each store 4096 items of data. When the last data is transferred, the processor automatically begins its operation.

Due to the complicated nature of the system operation, for purposes of description, the operation will be broken down into several separate processes. Process #1 will be the product determination for zero time delay which is the computation of the statistical quantity of variance. Process #2 will be the incrementation of the interarrival time memory and the checks performed upon the data. Process #3 will be the computation of the products between the ith location in the B-memory and the jth location in the A and T memories where the ith location is held fixed and the checks performed upon the data. Process #4 is the incrementing of the B-memory address and the checks performed upon the data. The processes are performed in this sequence in the device during normal operation, and references to these processes by number will be made during the following description to indicate the logical flow of the operation based on the data checks performed.

In process #1 with the address pointer 35 in the B-memory 34 set to i (in the beginning to one), the address pointers 36 and 37 in the A and T memories are set to match. Data words Ai and Bi are passed to a highspeed 16-bit by 16-bit integer multiplier 38, and the resulting 32-bit product is latched in a latch 39 and the zero memory locations in a covariance memory 40 and an occurrence memory 41 are addressed, by addresses 42 and 43. Memories 40 and 41 each store 512 items of data. If the product equals zero, the system control is passed to Process #4 by means of a process controller 44. The 32-bit data word in the zero memory location in occurrence memory 41, is incremented by one by means of an adder 45, latched by a latch 46 and then stored back into the zero memory location indicating that a product at zero time delay was computed. The 48-bit data word in the zero memory location in covariance memory 40, is latched by a latch 47 and summed with the latched product from the multiplier 38 in a 48-bit adder 48. The resulting data word is then stored back into the zero memory location in covariance memory 40.

In Process #2, if the value of the memory address pointers 36 and 37 for the T and A memories match the value of the address pointer 35 for the B-memory, a delta time accumulator 49, is set to zero. The memory address pointers 36 and 37 for the T and A memories are then incremented, (j=k+1, where k=i for the first pass through Process #2, and j otherwise). The data word in the jth location in the T memory 32, is checked. If the value is zero, which indicates that the interarrival time was greater than the measurement capabilities of the laser velocimeter data acquisition equipment, the system operation switches to Process #4. If the pointer is equal to 4096, the end of memory condition is reached, and the system operation is switched to Process #4. Otherwise, the data word is summed with the current value in the delta time accumulator 49 and the result checked to determine if it is greater than 512 delay times. If so, the system operation switches to Process #4. If not, the interarrival time is latched by a latch 50, and the lowest 4-bits removed, (fractional delay time increment). The latched value is then used as the address pointer 42 and 43. The data word pointed to in the covariance memory 40 is then latched by latch 47.

In Process #3, the data word in the ith location in the B-memory 34 and the data word in the jth location in the A-memory 33 are passed to the multiplier 38. The product is then checked for a zero value, which indicates an end of data condition in the B-memory. If the value is zero, the system operation is transferred to Process #4. If not, the product is latched by latch 39 and the data word from covariance memory 40 held in latch 47 are summed by adder 48 and stored in memory 40. The data word pointed to in the occurrence memory 41 is incremented by one by adder 45 and restored in memory 41. System control is now passed back to Process #2.

In Process #4, the address pointer 35 in B-memory 34, is incremented and compared with the value 4096. If the address pointer is equal to 4096, an end of memory condition exists and the system transfers control to the data output mode. Otherwise, the system control is transferred to Process #1.

In the output data mode computions have been completed and the unnormalized covariance function is stored in the covariance memory 40 and the histogram of the number of occurrences of each delta time delay is stored in the occurrence memory 41. A control signal is then sent from process controller 44 to the computer indicating that the final data is ready for transfer, and the address pointers 42 and 43 for memories 40 and 41 set to zero. A 16-bit parallel, direct memory access, full handshake transfer is begun through data selectors 51. The address pointer is then incremented and the process repeated until all of the data is transferred. Upon completion of the data transfer to the computer, memories 40 and 41 are cleared, (i.e., the value of zero is placed in all memory locations).

The final covariance function is obtained in the computer by dividing the covariance function element-by-element as stored in memory 40 by the number of occurrences of each time delay as given by the data from memory 41 and the removal of the scaling factors. The Fourier transform may then be performed on the data to obtain the turbulence power spectra.

The control for processes #1, #2, #3 and #4 is process controller 44. The design of a controller for performing the operations disclosed is within the skill of the art, hence, the details of process controller 44 are not disclosed in this application.

The advantage of this invention is that the data can be processed many times faster than it can by a general purpose computer.

Even though Processes 1 through 4 explains one way in which the data can be processed, other ways may be devised to perform the same functions without departing from the spirit and scope of this invention.

What is claimed is:

1. A hardware attachment to a computer used for computing a correlation function of random sampled data comprising:
   first and second memories for storing two sets of said sampled data;
   a third memory for storing the interarrival times between adjacent samples of said sampled data;

means for sequentially multiplying together all possible combinations of the random sampled data stored in said first and second memories;

fourth and fifth memories; and means responsive to said multiplying means and said third memory for storing in said fourth memory the multiplications made by said multiplication means in locations corresponding to the interarrival times between the data points multiplied together and for storing in said fifth memory the number of times a multiplication is stored in said fourth memory in each of said locations corresponding to an interarrival time between data points.

2. A hardware attachment according to claim 1 wherein said random sampled data is measurements made by a laser velocimeter.

3. A hardware attachment according to claim 1 wherein said means for storing data in said fourth and fifth memories includes means for accumulating the interarrival times stored in said third memory to form interarrival times between nonadjacent samples.

4. A hardware attachment according to claim 3 wherein said means for storing data in said fourth and fifth memories includes means for accumulating the multiplications from said multiplication means for each interarrival time and storing the accumulated multiplications in the corresponding interarrival time location in the fourth memory.

5. A hardware attachment according to claim 3 wherein said means for storing data in said fourth and fifth memories includes means for counting the number of multiplications for each interarrival time and storing the count in the corresponding location in the fifth memory.

* * * * *